Feb. 24, 1953 R. A. POLSON 2,629,226
HYDRAULIC POWER ALIGNING MECHANISM
Filed Sept. 26, 1946
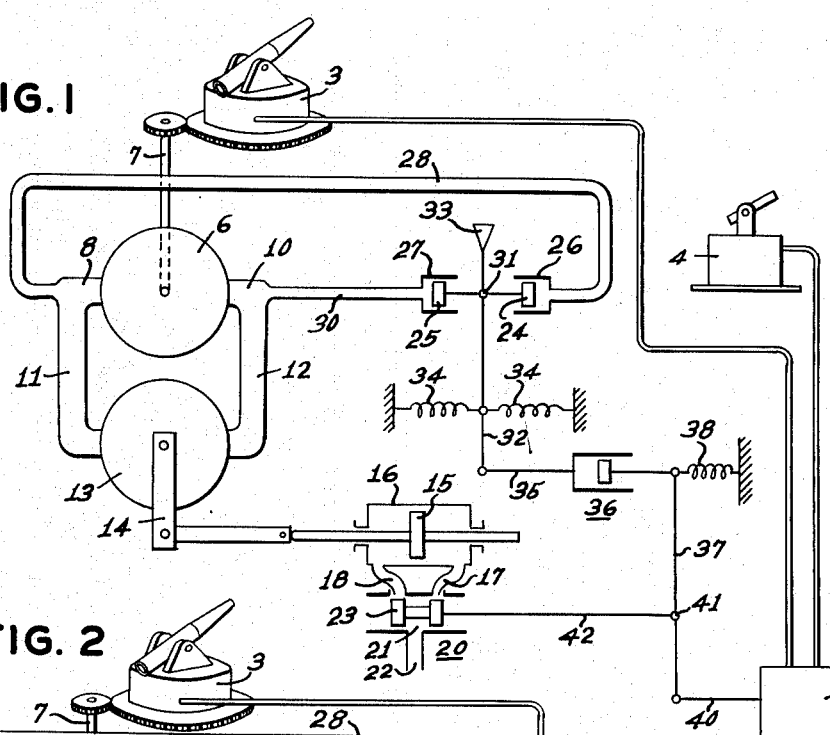
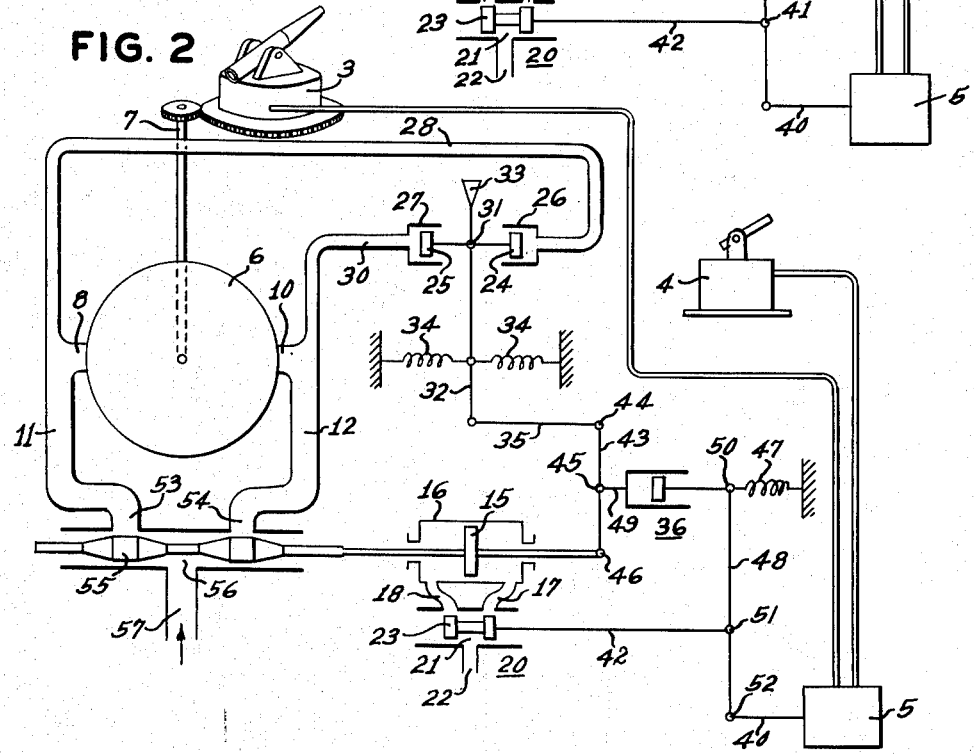
INVENTOR.
Reginald Alexander Polson
BY
ATTORNEYS

Patented Feb. 24, 1953

2,629,226

UNITED STATES PATENT OFFICE 2,629,226

HYDRAULIC POWER ALIGNING MECHANISM

Reginald Alexander Polson, Manchester, England, assignor to Metropolitan Vickers Electrical Company Limited, London, England, a company of Great Britain, and Vickers-Armstrongs Limited, London, England, a company of Great Britain Application September 26, 1946, Serial No. 699,432
In Great Britain April 28, 1943

Section 1, Public Law 690, August 8, 1946
Patent expires April 28, 1963

13 Claims. (Cl. 60—53)

This invention relates to control systems for maintaining power driven movable objects in alignment or other desired positional relationship with a directing means. In control systems of this kind means responsive to the misalignment of the movable object with respect to the directing member are arranged to control the motive equipment which drives the movable object so that there will be applied to the movable object a torque or force which reduces to zero the misalignment between the movable object and the directing member. In particular, the invention provides a system of the kind set forth which controls the supply of operating fluid to a hydraulic motor which drives the movable object.

Alignment control systems which respond only to the misalignment between the directing means and the movable object are generally unstable and tend to produce an oscillation of the movable object about the position corresponding to exact alignment with the directing member. In some cases this oscillation is self-sustained. Such oscillation of the movable object, whether self-sustained or only lightly damped, is especially likely to occur where the control system is required to cause rapid movements of the movable object to reduce misalignments between it and the directing member.

The principal feature of this invention is the provision of a control system of the kind set forth above which effects rapid and exact reduction of misalignments between a power driven movable object and its directing member, and which is stabilized to prevent undesirable oscillations of the movable object about that location which corresponds with zero misalignment between the movable object and its directing member. To achieve this feature of my invention, I have arranged my control system to be dependent in its operation not only upon the relative displacement between the movable object and the position it must assume to be in alignment with the directing member, but also upon one or more orders of the rate of change of the displacement of the movable object with respect to the position it must assume to be in alignment with the directing member, i. e. the rate of change, or first time derivative, of the misalignment which may be termed the velocity of the directing member with respect to the movable object; the change of velocity, or second time derivative, of the misalignment, termed the acceleration of the directing member with respect to the movable object; and the change of acceleration, or third time derivative of the misalignment which will be referred to as such. To effect this, the control system is caused to introduce in opposition to the force or torque applied to the movable object a control quantity which is representative of one or more orders of the rate of change of misalignment. This results in two desirable effects. As the movable object approaches the position of zero misalignment, the components of the torque representative of the velocity, acceleration, and rate of change of acceleration opposes the motion of the object and damps any tendency it may have to oscillate about the position of zero misalignment. When the movable object is required to follow rapid movements of the directing member the component of the torque proportional to the relative velocity of the movable object with respect to its position of zero misalignment with the directing member facilitates response to rapid changes in direction and velocity of the directing member.

According to my invention, means responsive to the misalignment of the movable object with respect to its directing member, which means may or may not also be responsive to the rate of change of that misalignment, controls the supply of operating fluid to a hydraulically operated power source for the movable object. Additional means responsive to the change in pressure of the operating fluid and to the rate of change of that pressure are provided which suppressively feed back into a summating means control quantities representative of this change and rate of change of pressure. Since the change in pressure across the hydraulic power source is proportional to the torque or force applied to the movable object and the torque or force applied to the movable object is representative of the acceleration of the movable object with respect to the directing member, the change of pressure and rate of change of pressure are representative respectively of the second and third time derivatives of the misalignment of the movable object with respect to the directing member.

These control quantities are introduced into the summating means through means selectively responsive to values of the control quantities greater and less than predetermined values. In the event that the value of the control quantities exceeds the predetermined value the selectively responsive means transmits only the component representative of the second time derivative or acceleration. When the value of the control quantities is less than the predetermined value, the selectively responsive means transmits to the summating means proportional amounts of the second and third time derivatives of the misalignment and the summating means imposes these quantities on the action of the means responsive to the misalignment and velocity of misalignment. Stabilization of the response of the movable object to the directing member is thereby obtained.

A complete and detailed description of two embodiments of my invention is contained in the following specification. This description will be readily understood by reference to the attached drawing in which Fig. 1 is a schematic representation of one hydraulic control system embodying my invention; and Fig. 2 is a schematic representation of another hydraulic control system embodying my invention.

Referring now to Fig. 1 a movable object to be directed, such as an artillery piece 3 on a rotatable mount, and a directing member, such as an aiming telescope 4 on a rotatable mount, are interconnected to means responsive to misalignment of the movable object with respect to the directing member. These means may be of any suitable kind but in this description will be assumed to comprise an electrical system of the Selsyn type which determines the energisation of a moving coil relay. This moving coil relay is similar to that shown in and described with reference to Fig. 2 of United States Patent No. 2,533,042, issued December 5, 1950.

The rotatable mount for the artillery piece 3 is driven through shaft 7 by a reversible hydraulic motor 6 which is supplied with operating fluid under pressure through ports 8 or 10 depending on the desired direction of rotation. These ports are connected by conduits 11 and 12 with a variable delivery pump 13 adapted to circulate operating fluid through the hydraulic motor in one direction or the other between the ports 8 and 10. The rate of circulation of the operating fluid is determined by a control member 14 so that the speed and direction at which the hydraulic motor is operated will be proportional to the displacement of the control member 14 in one direction or the other from its illustrated neutral position.

The hydraulic motor 6 and pump 13 may, for example, comprise a hydraulic transmission providing an infinitely variable velocity ratio between the means driving the pump 13 and the motor 6 of the type known as a variable speed transmission in which the delivery of the pump 13 is controlled by the inclination of a swashplate, the inclination of this swashplate being proportional to the displacement of the control member 14.

The control member 14 is actuated by a double acting fluid pressure servo mechanism, being coupled with a piston 15 of said mechanism. This piston is movable within a cylinder 16 having its two ends connected with control ports 17 and 18 of a control valve 20 which is provided with an inlet port 21 which, by way of a conduit partially shown at 22, is connected with a source of operating fluid under pressure. In the illustrated position of the movable member 23 of the control valve 20, flow of fluid to the cylinder 16 is obstructed, but fluid will be supplied to the right or left-hand side of the piston 15 by movement of the member 23 to the right or left of this closed position. Of course, the valve must allow discharge of fluid from the other side of the piston for return to the source. The rate of movement of the piston 15, and thereby of the control member 14, will therefore be dependent in direction and speed upon the sense and extent of displacement of the valve member 23 from the closed position.

The member 23 of the control valve 20 is connected (in a manner more particularly described hereinafter) with the moving coil relay device 5 so as to receive a displacement which is dependent upon the misalignment between the artillery piece and the telescope. A convenient electrical circuit for this purpose is illustrated in Fig. 1 of the above mentioned Letters Patent. The displacement of the moving coil relay device will include not only a component dependent on the misalignment, but also a component dependent upon the first time derivative of said misalignment, that is to say upon the relative velocity between the artillery piece and the directing telescope. The displacement of the valve member 23 of the auxiliary control valve is further modified as hereinbefore set forth by a particular means hereinafter to be described, but it may be stated now that, with the control system as so far described, the control valve 20 will operate to cause movement of the piston 15 in one direction or the other at a speed and in a direction dependent on the extent and sense of misalignment between the movable object and control member, and more particularly dependent on the magnitude and sense of a control quantity comprising the sum of components dependent respectively upon the misalignment and the rate of change of said misalignment. The movement of the servo piston 15 in this manner will cause, by the setting imposed on the control member 14, a corresponding change in the velocity of the artillery piece until the displacement of said member 14 from the central position thereof becomes just sufficient in one or the other direction to cause movement of the artillery piece with a velocity corresponding to the velocity of the directing telescope and with substantially zero misalignment. As this condition of alignment is effected, the relay device tends to return the auxiliary control valve 23 to its illustrated central position.

The stabilising means according to the invention as embodied in the control system of Fig. 1 comprises a pair of pistons 24 and 25 working within their separate cylinders 26 and 27 which are connected by means of conduits 28 and 30 respectively with the ports 8 and 10 of the hydraulic motor 6. The pistons 24 and 25 are pivotally connected with an intermediate point 31 of a lever 32 having a fixed pivot at 33. The two pistons act in opposition to one another on said lever whereby the resultant force applied by the pistons to the lever 32 is dependent upon the pressure difference existing between the ports 8 and 10 of the motor and is, therefore, representative of the torque applied to the mount of the artillery piece. The lever 32 is provided with compliant means such as springs 34 biasing the lever to the illustrated central position. The free end of the lever is connected by means of a link 35 and a dash pot 36 with one end of a floating lever 37, which is biased by compliant means such as spring 38 to the illustrated central position thereof. The other end of the floating lever 37 is connected by a link 40 with the moving coil relay device 5. An intermediate point 41 of the lever 37 is connected by means of a link 42 with the valve member 23 of the control valve. This floating lever constitutes a summating mechanism. The total effect produced by this arrangement is such that a change in the pressure across the hydraulic motor will tend to reset the control valve 23 to oppose changes in the speed and direction of rotation of the artillery piece.

For example, assume that in response to relative motion or misalignment between the artillery piece and the directing telescope 4 the moving coil device 5 is energized so as to move the link 40 to the right in Fig. 1; this opens the control valve 23 to allow fluid to flow from the conduit 22 through the port 17 to the right hand side of the piston 15, thereby moving the control member 14 to the left. This movement causes fluid to circulate through the motor from the port 8 to the port 10. The pressure at the port 8 being greater than that at the port 10, the piston 24 displaces the lever 32 against the springs 34 in the clockwise direction and by an amount proportional to the differential in pressure between the ports, and consequently, to the torque applied to the artillery piece. The rate of change of the pressure differential at the ports will also be reflected in the motion of the lever 32. Since the torque applied to the artillery piece determines its acceleration, the pressure differential at the ports which determines the torque is related to the acceleration of the artillery piece with respect to the directing telescope, it being the second time derivative of the misalignment. It follows that the rate of change of the pressure differential is related to the rate of change of acceleration of the artillery piece with respect to the directing telescope which is the third time derivative of the misalignment. Thus, both the second and third time derivatives of the misalignment appear as components of the motion of the lever 32.

The motion of the lever 32 is transmittted through the dash pot 36 to effect a leftward displacement of the upper end of the floating lever 37. The dash pot 36 is adjusted so as to transmit movement of the lever 32 to the lever 37 for changes and rates of changes of the pressure differences corresponding with the accelerations involved in the required speed and direction of response of the artillery piece to changes in speed and direction of the directing telescope. For such changes and rates of changes of pressure, the dash pot will transmit to the upper end of the lever 37 a force which is dependent upon the displacement of the lever 32 and which is also dependent in part upon the rate of change of said displacement. Consequently there will be superimposed on the opening of the control valve 20 by the moving coil relay device 5 a movement which is dependent upon the second and third time derivatives of the displacement of the artillery piece with respect to the directing telescope. For rates of change of pressure in excess of predetermined values dependent on the characteristics of the dash pot and the bias spring 38, the dash pot transmits movement solidly from the lever to the upper end of the floating lever so that the superimposed movement then contains only the second time derivative of the displacement of the artillery piece. Stabilisation of the operation of the control system is thus effected in the manner hereinbefore set forth.

It will be understood that in place of the dash pot 36 any other suitable means adapted to transmit a force varying with the velocity of movement between two co-operating parts of said device, which parts are coupled respectively with the lever 32 and with the upper end of the lever 37, may be employed.

In a modified arrangement of the control system according to the invention shown in Fig. 2, there is illustrated an alternative form of control of the hydraulic motor. The motor is supplied with operating fluid through conduit 57 by a suitable constant pressure variable delivery pump. The flow of fluid is controlled by a throttle valve 56 which may be of the piston type shown. The control ports 53 and 54 of the throttle valve are connected respectively to ports 8 and 10 of the hydraulic motor 6 by conduits 11 and 12. While the control member 55 of the valve 56 is in the position illustrated in Fig. 2, the flow of fluid to ports 8 and 10 is blocked, whereas the valve will permit fluid to be supplied to port 8 or 10 as the control member is displaced to the left or right of the central position shown. After passing through the motor the fluid returns through port 54 or 53, as the case may be, and is returned to the reservoir of the pump. The operating fluid is supplied to the motor at a rate dependent on the extent of the displacement of the control member 55 from the illustrated central position. By this means the artillery piece will be rotated at a speed which is likewise dependent on the extent of the displacement of the control member.

The control system of Fig. 2 has pressure responsive pistons 24 and 25 whose operation on the lever 32 is related to the pressure differential across the motor as in the system of Fig. 1. However, instead of the free end of lever 32 being connected directly to an element of the dash pot 36 by the link 35, the link 35 interconnects the free end of lever 32 and one end 44 of a second floating lever 43. An intermediate point 45 of this second floating lever is connected to one element of the dash pot by link 49 and the opposite end 46 of the lever is connected to the control rod of the piston 15 which actuates the throttle valve 56. This floating lever is a summating lever which transmits to the dash pot the algebraic sum of the first, second and third time derivatives of the misalignment. The dash pot transmits this combined control quantity accordingly as the value of the control quantity is less than or greater than predetermined values related to the response characteristics of the dash pot and spring 47.

The other element of the dash pot is connected to one end 50 of a floating lever 48, constituting another summating mechanism, and is biased to the position illustrated by the spring 41. In the same manner as in Fig. 1, this lever 48 is connected at an intermediate point 51 to the control member 23 of the valve 20, and at the opposite end 52 to the moving coil relay device 5.

In the operation of the control system shown in Fig. 2 the displacement of the point 45 of the floating lever 43 will be proportional to the algebraic sum of the displacements of the lever 32 and the piston 15. In other words, the upper and lower ends of the floating lever 43 are respectively displaced by amounts related to the pressure differential across the motor and the rate of change thereof, and to the opening of the main control valve which determines the velocity of the movable object with respect to the directing member. In the general case the intermediate point 45 of the floating lever 43 receives a movement which is transmitted to the dash pot 36. This movement, due to the component of motion of the intermediate point 45 of the floating lever 43 dependent upon the pressure applied to the hydraulic motor, will be dependent upon the second and third time derivatives of the displacement of the artillery piece with respect to the directing telescope as above described with reference to Fig. 1. Furthermore, due to the component of motion of the intermediate point 45 of lever 43 derived from the connection at 46 of the floating lever 43 with the piston 15, a component proportional to the rate of supply of liquid to the motor, the motion of lever 43 at point 45 will include a component dependent upon the velocity or first time derivative of the displacement of the artillery piece. It will also be apparent that over a certain range of rates of change of said velocity of the artillery piece, that is to say rates of change of position of the servo piston 15, the motion of the point 45 will include a further variable component dependent upon the second time derivative of the displacement of the artillery piece with respect to the directing telescope. As the output of the floating lever 43 is transmitted through the dash pot in accordance with criteria similar to those stated for the embodiment of Fig. 1 there is imposed on the output of the floating lever 48 a control quantity which opposes the response of the motor to gross indications of misalignment and velocity of changes of misalignment between the directing telescope and the artillery piece, and by this means stabilisation of the control system is obtained.

In some applications of the arrangement shown in Fig. 2 the moving coil device 5 or equivalent misalignment responsive means may satisfactorily be arranged to respond only to the misalignment of the artillery piece with respect to the directing telescope without the inclusion of a component dependent upon a time derivative of said misalignment. This follows from the fact that the extent to which the control valve 20 or other means determinative of the velocity of the motor is actuated determines the velocity of the artillery piece with respect to the directing telescope, and a control component representative of velocity is fed back into the system by the lever 43. It will thus be understood that in the arrangement shown in Fig. 2 the electrical circuit for the moving coil relay device 5 may be modified so as to omit the component in the energisation of said device dependent upon the rate of change of the misalignment.

In modifications of the control systems above described the moving coil devices 5 may be replaced by means according to United States Letters Patent No. 2,533,042 for coupling the lower ends of the floating levers 37 and 48 with means responding to the misalignment between the artillery piece and the directing telescope and for adding to the motion of the lower end of said levers components dependent upon the rate of change of movement of said misalignment responsive means.

It will be understood that the summating mechanisms of Fig. 2 may be employed for controlling the variable speed transmission 13 indicated in Fig. 1, and that the summating mechanism of Fig. 1 may be employed for controlling the throttle valve 56 shown in Fig. 2. Furthermore, either of the mechanisms may be employed for controlling the pressure applied to the hydraulic motor by any suitable means other than those described.

I claim:

1. A hydraulic power aligning system, comprising: a movable directing member; a movable object to be moved in alignment with said directing member; a hydraulic motor for driving said movable object; a first control means for varying the hydraulic fluid supply of said motor; a first actuating element for said first control means, to the displacements of which the velocity of said motor is related; a second control means operatively connected with said first actuating element; a summating mechanism producing as output a motion which is a function of the algebraic sum of two inputs; a second actuating element for said second control means, to the displacements of which the velocity of said first actuating element and, therefore, the acceleration of said motor are related, effectively connected to the output of said summating mechanism; means effectively transmitting misalignment between said movable object and said directing member as one input to said summating mechanism; means responsive to the hydraulic pressure differenial across said motor; a first compliant means limiting the response of said means responsive to the hydraulic pressure differential to an amount related to that pressure differential; a dash pot effectively connected at one side to said responsive means and at the other side to produce the other input to said summating mechanism; and a second compliant means effectively connected to said other side of said dash pot and limiting the displacement thereof to amounts proportional to the force transmitted by said dash pot from said means responsive to the hydraulic pressure differential, whereby the effective connection of said directing member into the system is reset when the rate of change of pressure differential across said hydraulic motor exceeds a predetermined value having a range of settings varying according to said rate of change up to an amount dependent upon said pressure differential.

2. The combination of claim 1 in which the second compliant means is a spring means arranged to impose on said dash pot a force proportional to the displacement of the side of the dash pot to which said spring is connected.

3. The combination of claim 2 in which means are provided responsive to the degree of actuation of the first control means operatively coupled to the second actuating means through the dash pot, whereby there is further superimposed on the response of the control means a component dependent on changes in the rate of supply of liquid to the motor and thereby upon the rate of change of velocity thereof and in a direction to oppose changes in said velocity.

4. The combination of claim 3 in which the dash pot has its cooperating elements coupled respectively with the second actuating element and with the output element of a summating mechanism, the input elements of said summating mechanism being coupled respectively with the means responsive to the hydraulic pressure differential across said hydraulic motor and the means responsive to the degree of actuation of the first control means.

5. The combination of claim 4 in which the summating mechanism consists of a floating lever, the input and output elements of said mechanism being constituted by different points of said lever.

6. The combination of claim 5 in which the first control means is actuated by a fluid servo device, a control valve of which is coupled with or forms the second actuating element.

7. The combination of claim 1 in which the effective connection between the dash pot and the directing member includes coupling spring means arranged to impose on said dash pot a force proportional to the displacement of the side of said dash pot to which said spring means is connected and is transmitted through a summating mechanism, one input element of which is coupled to the side of said dash pot connected to said directing member, one input element of which is coupled to said directing member, and an output element of which is coupled to the second actuating element.

8. The combination of claim 7 in which the summating mechanism is a floating lever, the input and output elements of said mechanism being constituted by different points of said lever.

9. The combination of claim 1 in which the motor is supplied with operating liquid from a constant pressure variable delivery source and the first control means is a reversing valve intermediate said motor and said source.

10. The combination of claim 1 in which the hydraulic motor is the output part of a variable speed transmission of the multiple swash plate type.

11. The combination of claim 10 in which the first control means is a variable inclinable swash plate in the pump part of the variable speed transmission.

12. In a hydraulic power aligning mechanism including a movable directing member, a movable object to be aligned with said directing member, a hydraulic motor driving said movable object, a first control means directly controlling the supply of operating liquid to said motor, and a second control means for actuating said first control means in accordance with the misalignment of said movable object with respect to said directing member so that said motor produces a torque tending to reduce said misalignment to zero, the improvement which includes in combination a first summating means, means responsive to the fluid pressure applied to said motor coupled to one input element of said first summating means, means responsive to the degree of actuation of said first control means coupled to another input element of said first summating means, a dash pot, a second summating means, an output element of said first summating means coupled to an input element of said second summating means through said dash pot, means responsive to the misalignment between the directing member and the movable object coupled to another input element of said second summating means, and a second actuating element of said second control means controlling the actuation of said first control means coupled with an output element of said second summating means.

13. The combination of claim 12 in which the summating means are floating levers, the input and output elements of said summating means being constituted by different points of said levers.

REGINALD ALEXANDER POLSON.

REFERENCES CITED

The following references are of record in the file of this patent:

UNITED STATES PATENTS

| Number | Name | Date |
|---|---|---|
| 1,372,502 | Grun | Mar. 22, 1921 |
| 2,056,896 | Douglas | Oct. 6, 1936 |
| 2,077,384 | Dettenborn | Apr. 20, 1937 |
| 2,104,627 | von Manteuffel | Jan. 4, 1938 |
| 2,188,834 | Fischel et al. | Jan. 30, 1940 |
| 2,238,061 | Kendrick | Apr. 15, 1941 |
| 2,285,069 | Vickers | June 2, 1942 |
| 2,291,011 | Vickers | July 28, 1942 |
| 2,408,070 | Hull | Sept. 24, 1946 |
| 2,409,190 | Brown | Oct. 15, 1946 |
| 2,533,042 | Polson | Dec. 5, 1950 |

FOREIGN PATENTS

| Number | Country | Date |
|---|---|---|
| 453,928 | Great Britain | June 17, 1935 |